United States Patent
Choi et al.

(10) Patent No.: US 9,809,282 B2
(45) Date of Patent: Nov. 7, 2017

(54) LIQUEFIED GAS TRANSFER DEVICE FOR REDUCING BOIL-OFF GAS

(71) Applicant: SAMSUNG HEAVY IND. CO., LTD., Seoul (KR)

(72) Inventors: Sung-Yun Choi, Gyeongsangnam-do (KR); Yong-Seok Song, Busan (KR); Seung-Hyuk Kim, Gyeongsangnam-do (KR); Ho-Byung Yoon, Gyeongsangnam-do (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 0 days.

(21) Appl. No.: 14/896,666

(22) PCT Filed: Jul. 4, 2014

(86) PCT No.: PCT/KR2014/006009
§ 371 (c)(1),
(2) Date: Dec. 7, 2015

(87) PCT Pub. No.: WO2015/002499
PCT Pub. Date: Jan. 8, 2015

(65) Prior Publication Data
US 2016/0129976 A1  May 12, 2016

(30) Foreign Application Priority Data

Jul. 5, 2013 (KR) ........................ 10-2013-0078804

(51) Int. Cl.
*F17C 6/00* (2006.01)
*F17C 13/04* (2006.01)
(Continued)

(52) U.S. Cl.
CPC ................ *B63B 25/16* (2013.01); *F17C 3/00* (2013.01); *F17C 6/00* (2013.01); *B63B 27/24* (2013.01);
(Continued)

(58) Field of Classification Search
CPC ...... F17C 2205/0323; F17C 2205/0335; F17C 2205/0352; F17C 2265/03;
(Continued)

(56) References Cited

U.S. PATENT DOCUMENTS 5,069,244 A * 12/1991 Miyazaki .............. C23C 16/448
137/209
5,771,946 A * 6/1998 Kooy ........................ F17C 6/00
141/11
(Continued)

FOREIGN PATENT DOCUMENTS

JP  55-179287  12/1980
JP  56-49388   5/1981
(Continued)

OTHER PUBLICATIONS

International Search Report for PCT/KR2014/006009 mailed on Sep. 25, 2014 and its English translation from WIPO.
(Continued)

*Primary Examiner* — Seth W Mackay-Smith
(74) *Attorney, Agent, or Firm* — Ladas & Parry, LLP

(57) ABSTRACT

Provided is a liquefied gas transfer device for reducing boil-off gas. The liquefied gas transfer device for reducing boil-off gas comprises: at least one transfer pipe formed in a vertical direction inside a quay for storing liquefied gas so as to transfer the liquefied gas; a branch pipe which is branched from a lower part of the transfer pipe to one side of the transfer pipe, and which has an end part opened toward a bottom surface of the quay; a valve which is (Continued)

connected to the branch pipe and/or the transfer pipe, and which opens and closes the branch pipe or the transfer pipe so as to move the liquefied gas from the transfer pipe to the branch pipe; and a resistance member disposed inside the branch pipe so as to interrupt the flow of the liquefied gas.

6 Claims, 9 Drawing Sheets

(51) Int. Cl.
    *B63B 25/16*     (2006.01)
    *F17C 3/00*     (2006.01)
    *B63B 27/24*     (2006.01)
    *B63J 99/00*     (2009.01)

(52) U.S. Cl.
    CPC . *B63J 2099/003* (2013.01); *F17C 2201/0133* (2013.01); *F17C 2201/032* (2013.01); *F17C 2201/052* (2013.01); *F17C 2201/056* (2013.01); *F17C 2201/058* (2013.01); *F17C 2205/0323* (2013.01); *F17C 2205/0335* (2013.01); *F17C 2205/0352* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2225/0161* (2013.01); *F17C 2225/033* (2013.01); *F17C 2225/047* (2013.01); *F17C 2260/018* (2013.01); *F17C 2265/03* (2013.01); *F17C 2270/0178* (2013.01); *Y02T 70/5263* (2013.01)

(58) Field of Classification Search
    CPC ...... F17C 2270/011; F17C 6/00; Y02T 70/90; Y10T 137/2544; Y10T 137/2557
    See application file for complete search history.

(56) References Cited

U.S. PATENT DOCUMENTS

| | | | | |
|---|---|---|---|---|
| 5,964,254 | A * | 10/1999 | Jackson | B01J 4/00 137/209 |
| 6,199,599 | B1 * | 3/2001 | Gregg | B01J 4/00 137/209 |
| 6,244,053 | B1 * | 6/2001 | Gulati | F17C 6/00 62/50.1 |
| 6,311,738 | B1 * | 11/2001 | Mason | F17C 5/002 141/18 |
| 6,598,564 | B2 * | 7/2003 | Gerstendorfer | B63J 99/00 122/448.1 |
| 7,497,180 | B2 * | 3/2009 | Karlsson | B63J 99/00 114/74 R |
| 8,783,281 | B2 * | 7/2014 | Carter | F02M 21/0212 123/304 |
| 9,316,215 | B2 * | 4/2016 | Mackey | F04B 23/021 |
| 2002/0056278 | A1 * | 5/2002 | Zurecki | F17C 6/00 62/50.1 |
| 2004/0068993 | A1 * | 4/2004 | Irie | F17C 1/002 62/48.2 |
| 2005/0109399 | A1 * | 5/2005 | Wodjenski | F17C 13/04 137/240 |
| 2006/0010882 | A1 * | 1/2006 | Oldham | F17C 13/025 62/50.1 |
| 2008/0105310 | A1 * | 5/2008 | Ogami | F17C 13/04 137/557 |
| 2008/0190117 | A1 * | 8/2008 | Lee | F17C 3/00 62/47.1 |
| 2011/0114193 | A1 * | 5/2011 | Chen | F17D 5/02 137/14 |
| 2013/0232997 | A1 * | 9/2013 | Gustafson | F17C 7/04 62/48.1 |

FOREIGN PATENT DOCUMENTS

| | | |
|---|---|---|
| JP | 56-90195 | 7/1981 |
| JP | 63-3594 | 1/1988 |
| JP | 11-37392 | 2/1999 |
| JP | 2000-240896 | 9/2000 |
| JP | 2009-30675 | 2/2009 |
| JP | 2010-261489 | 11/2010 |
| KR | 2002-0042063 | 6/2002 |
| KR | 10-0695963 | 3/2007 |
| KR | 10-2012-0013255 | 2/2012 |
| KR | 10-2013-0000223 | 1/2013 |

OTHER PUBLICATIONS

Written Opinion of the International Searching Authority for PCT/KR2014/006009 mailed on Sep. 25, 2014 and its machine English translation.
Notice of Allowance dated Dec. 17, 2014 for Korean Patent Appl. No. 10-2013-0078804 and its English summary provided by Applicant's foreign counsel.
Office Action dated Jul. 14, 2014 for Korean Patent Appl. No. 10-2013-0078804.
Office Action dated Oct. 10, 2016 for Chinese Patent Application No. 201480035775.0 and its English machine translation by Google Translate.
Office Action dated Nov. 29, 2016 for Japanese Patent Application No. 2016-518282 and its English machine translation by Google Translate.
International Preliminary Report on Patentability for PCT/KR2014/006009 mailed on Jan. 14, 2016 and its English translation provided by WIPO.
Office Action dated May 26, 2017 for Chinese Patent Application No. 201480035775.0 and its English translation provided by Applicant's foreign council.
Notice of Allowance dated Jun. 2, 2017 for Japanese Patent Application No. 2016518282 and its English translation by Global Dossier.

* cited by examiner

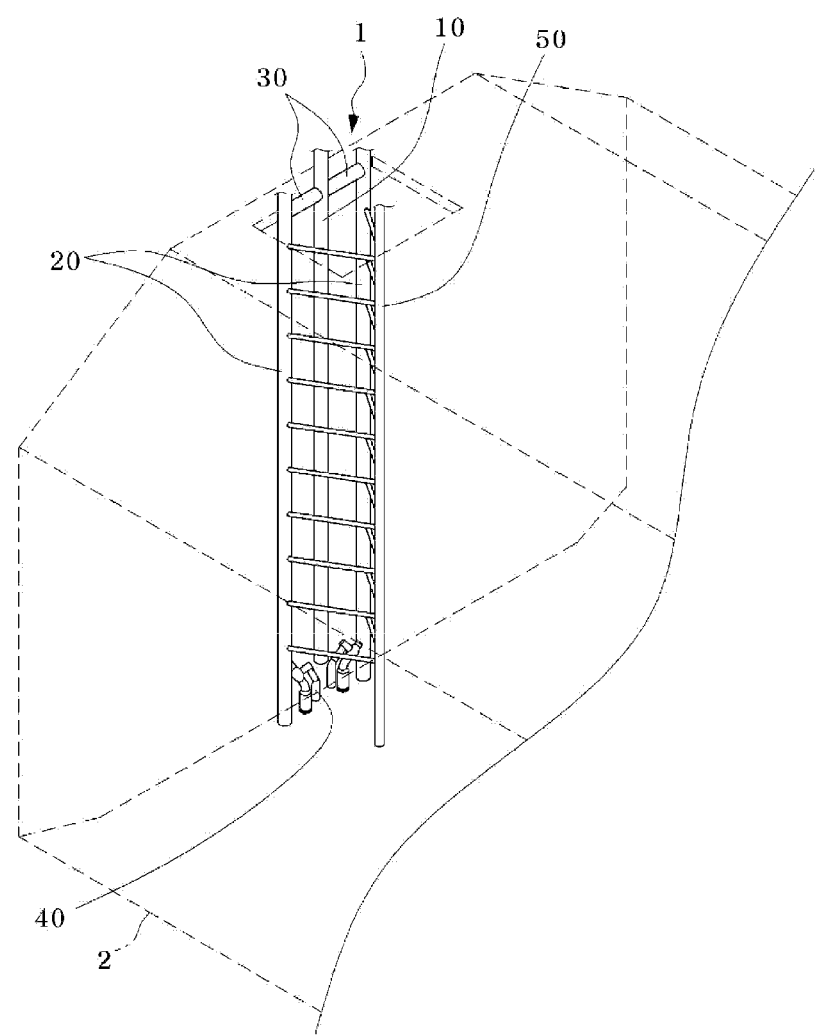
[Fig. 1]

[Fig. 2]
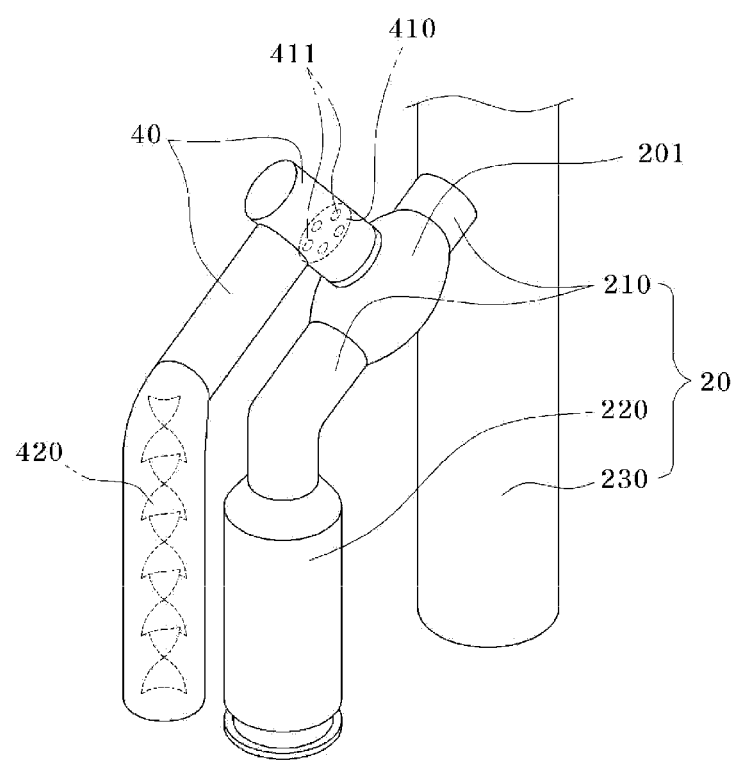

[Fig. 3]
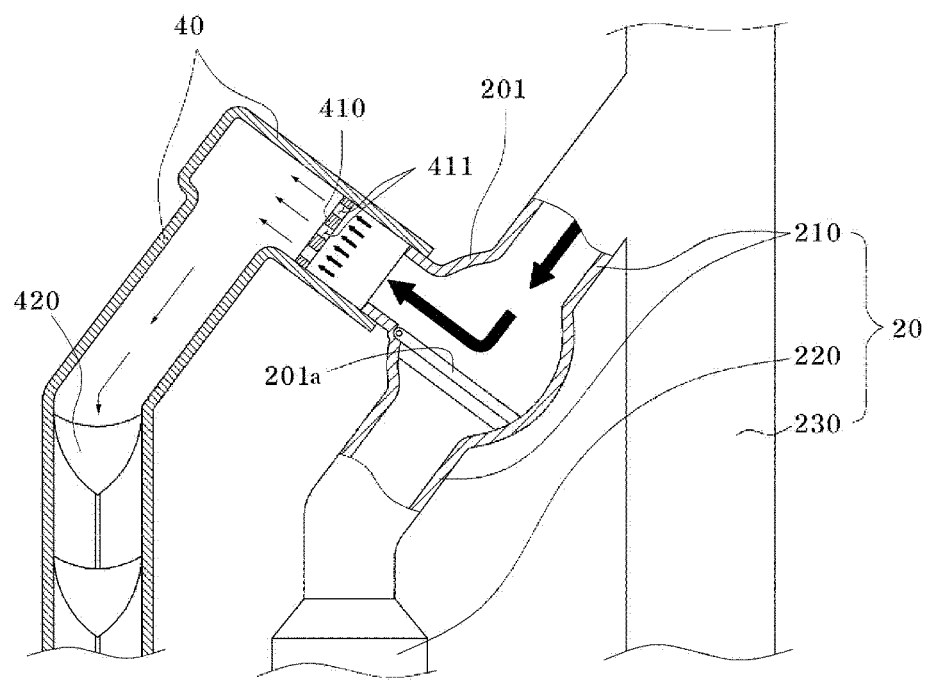

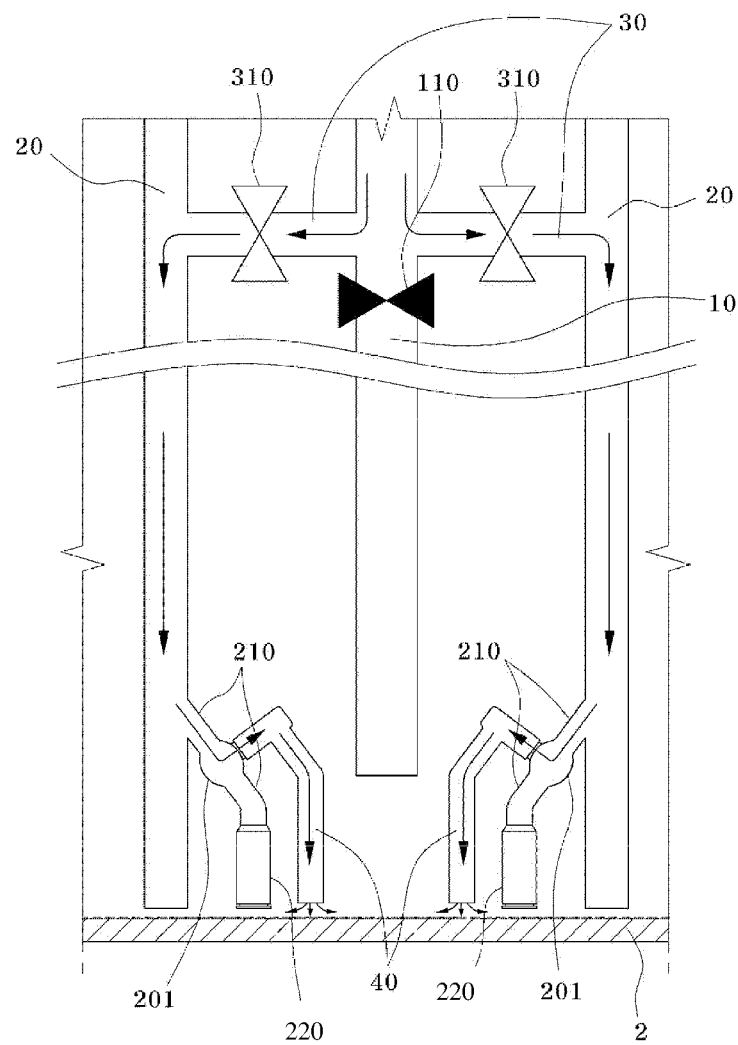
【Fig. 4】

[Fig. 5]
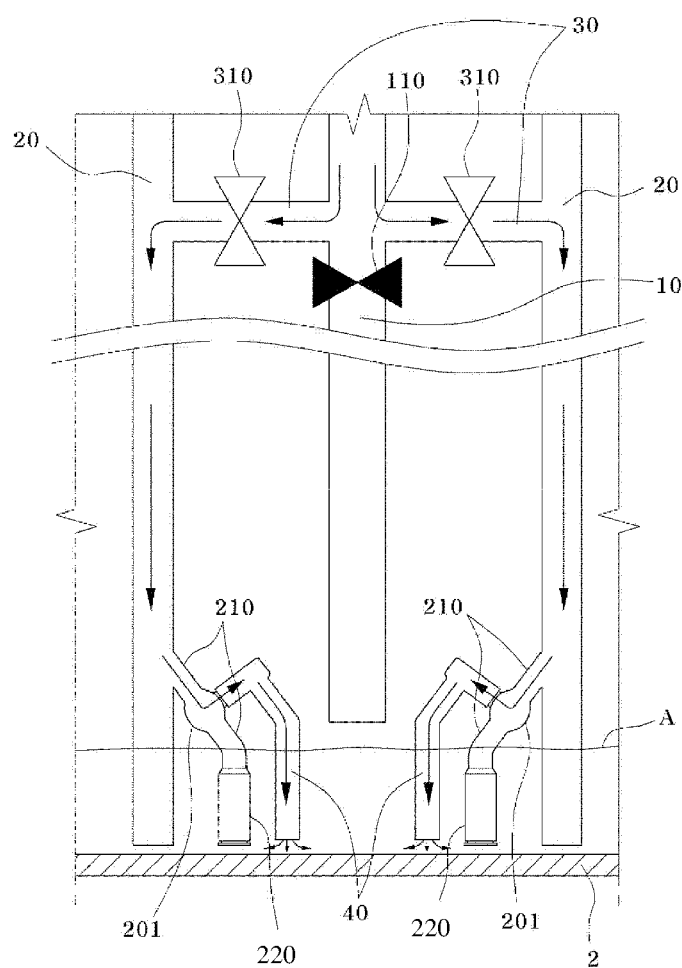

[Fig. 6]
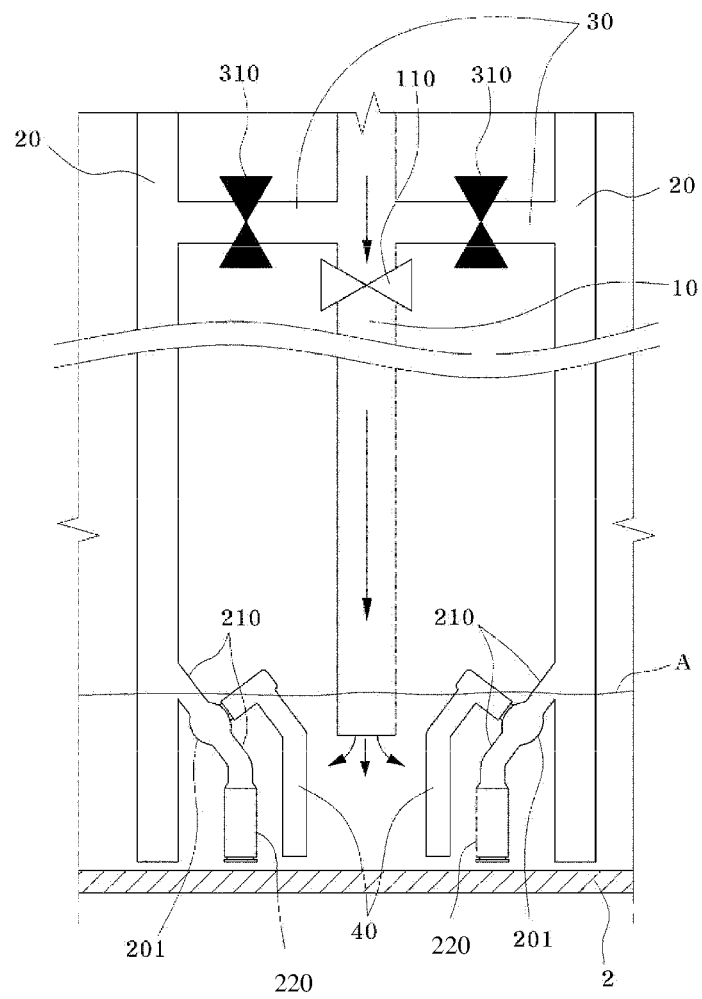

[Fig. 7]
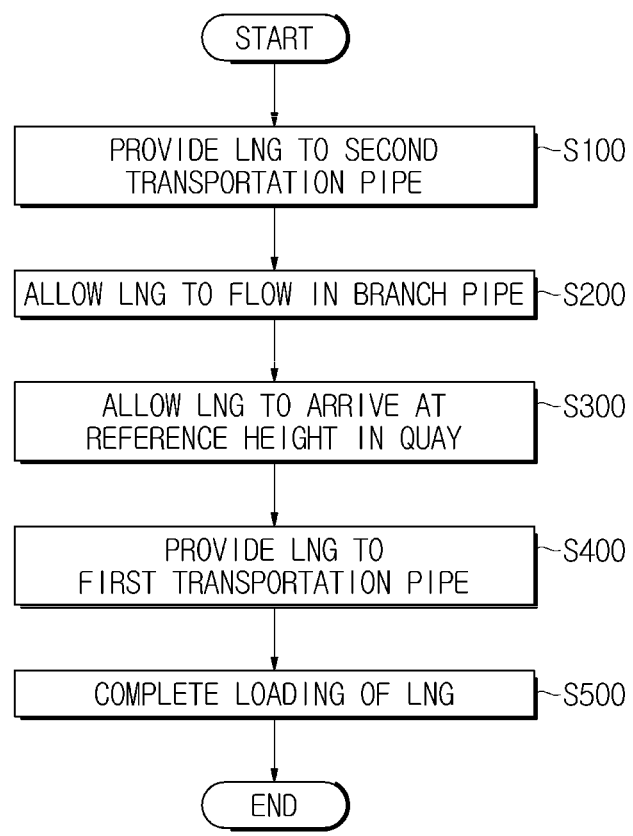

[Fig. 8]
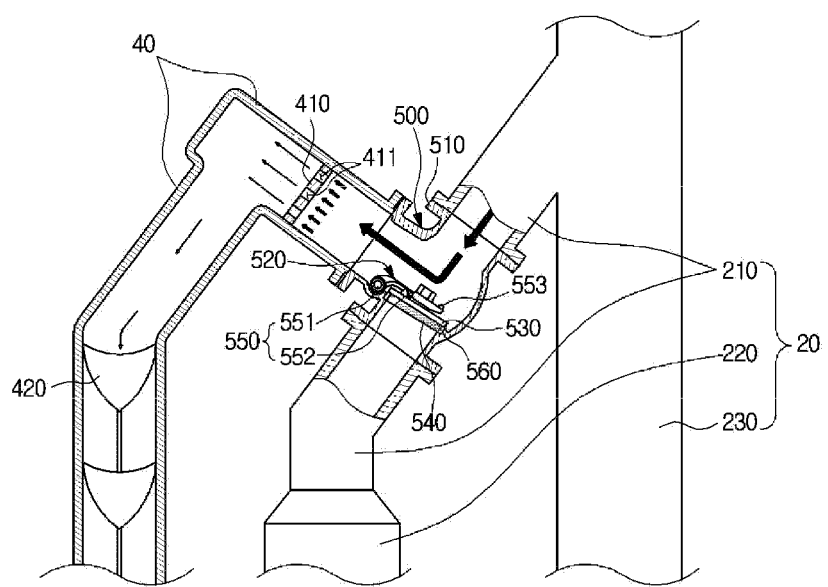

[Fig. 9]
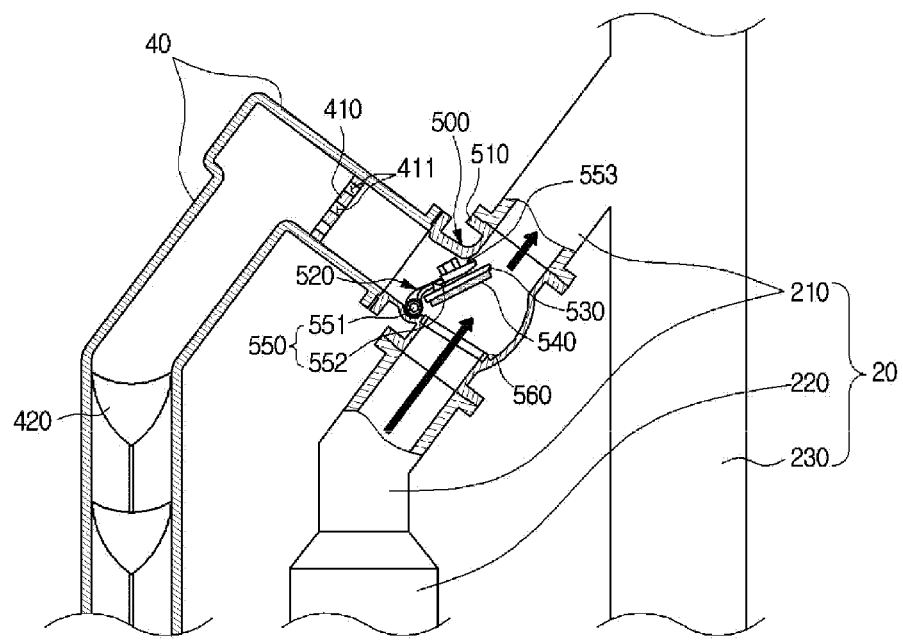

LIQUEFIED GAS TRANSFER DEVICE FOR REDUCING BOIL-OFF GAS

CROSS-REFERENCE TO RELATED APPLICATIONS

This application is the U.S. National Stage of International Patent Application No. PCT/KR2014/006009 filed on Jul. 4, 2014, which claims priority to Korean Patent Application No. 10-2013-0078804 filed on Jul. 5, 2013, the disclosures of which are hereby incorporated in their entireties by reference.

TECHNICAL FIELD

The present invention relates to a liquefied gas transportation apparatus which transports a liquefied gas, and more particularly, to a liquefied gas transportation apparatus which reduces the occurrence of boil-off gas while transporting a liquefied gas.

BACKGROUND ART

Liquefied natural gas (LNG), which is one of liquefied gases, is a fossil fuel buried underground and is formed by changing a natural gas, a main ingredient of which is hydrocarbons, into an extremely low temperature liquid state through pressurizing and cooling processes. Since a liquefied gas has a significantly reduced volume compared with a gaseous state, transportation and storage thereof are relatively easy, and for example, it is possible to transport the liquefied gas to a consumption place at a long distance using a dedicated carrying vessel, etc. provided with a particularly manufactured quay capable of maintaining an extremely low temperature state.

A transportation apparatus, which allows such a liquefied gas to flow into the quay for shipping or loading the liquefied gas or to flow outside the quay for unloading, is provided in the quay. Such a transportation apparatus is generally formed of one or more transportation pipes and includes a pump device for moving the liquefied gas into or from the pipes. Korean Patent Publication No. 10-2012-0013255 discloses an example of the transportation apparatus.

However, during a typical transportation process, since a flow rate or speed of a liquefied gas rapidly changes, a pressure inside the transportation pipes drops and the liquefied gas boils off, thereby excessively generating boil-off gas. Such limitation may further increase when the transportation pipes are vertically installed in such a way that the liquefied gas rapidly drops from tops of the pipes in the direction of gravity.

Also, the boil-off gas may occur when a liquefied gas which flows at a high speed is rapidly discharged to a broad space inside the quay with a low pressure. Accordingly, it is necessary to develop an apparatus capable of being applied to a liquefied gas transportation process to minimize the occurrence of boil-off gas.

PRIOR ART DOCUMENT

Patent Document 1: Korean Patent Publication No. 10-2012-0013255 (Feb. 14, 2012)

DISCLOSURE

Technical Problem

To overcome such a limitation, it is an aspect of the present invention to provide a liquefied gas transportation apparatus for reducing boil-off gas, which reduces the occurrence of boil-off gas while transporting a liquefied gas.

Aspects of the present invention are not limited thereto and additional aspects of the invention will be obvious to one of ordinary skill in the art from the following description.

Technical Solution

One aspect of the present invention provides a liquefied natural gas (LNG) transportation apparatus for reducing boil-off gas, including at least one transportation pipe which is vertically formed in a quay which stores LNG and transports the LNG, a branch pipe which branches off from a bottom of the transportation pipe toward one side of the transportation pipe, and an end portion thereof is open toward a bottom surface of the quay, a valve which is connected to at least one of the branch pipe and the transportation pipe and opens and closes one of the branch pipe and the transportation pipe to move the LNG from the transportation pipe to the branch pipe, and a resistor member which intervenes in the branch pipe to interrupt a flow of the LNG.

The resistor member may be an orifice plate which includes at least one flow hole through which the LNG passes.

The transportation pipe may include a first transportation pipe which allows the LNG to flow into the quay and a second transportation pipe which allows the LNG to flow into the quay or to be discharged outside the quay, and the branch pipe may branch off from the second transportation pipe.

The transportation pipe may further include a connection pipe which connects the first transportation pipe with the second transportation pipe, and the LNG may selectively move to one of the first transportation pipe and the second transportation pipe along the connection pipe.

The valve may be formed as a check valve which is connected to a bottom of the second transportation pipe to prevent the LNG discharged along the second transportation pipe from flowing backward, and the branch pipe may branch off from the check valve.

An end portion of the first transportation pipe may be located at a place higher than those of end portions of the second transportation pipe and the branch pipe from the bottom surface of the quay.

The apparatus may further include a fluid mixing device inserted into the branch pipe and disposed between an end portion of the branch pipe and the resistor member.

The valve may include an opening and closing unit which selectively opens and closes the branch pipe and the transportation pipe.

Advantageous Effects

According to the embodiment of the present invention, a liquefied gas transportation apparatus can effectively reduce the occurrence of boil-off gas by preventing boil-off of a liquefied gas and can easily load the liquefied gas in a quay while maintaining a minimal boil-off gas amount.

BRIEF DESCRIPTION OF DRAWINGS

FIG. 1 is a perspective view of a liquefied natural gas (LNG) transportation apparatus for reducing boil-off gas in accordance with one embodiment of the present invention.

FIG. 2 is a partially enlarged perspective view illustrating a second transportation pipe and a branch pipe of the transportation apparatus of FIG. 1.

FIG. 3 is a cross-sectional view illustrating insides of the branch pipe and a check valve of FIG. 2.

FIGS. 4 to 6 are schematic operation diagrams of the transportation apparatus of FIG. 1.

FIG. 7 is a flowchart illustrating a process of loading LNG using the transportation apparatus of FIG. 1.

FIGS. 8 and 9 are cross-sectional views illustrating a modified example of the check valve included in the LNG transportation apparatus for reducing boil-off gas in accordance with one embodiment.

MODE FOR INVENTION

Advantages, features, and methods of achieving the same will be specified with reference to embodiments that will be described in detail with reference to the attached drawings. However, the present invention will not be limited to the embodiments described below and may be embodied in various different forms. Merely, the embodiments are provided to completely disclose the present invention and to allow one of ordinary skill in the art to fully understand the present invention. The present invention should be defined only by the claims thereof. Hereinafter, throughout the specification, like reference numerals designate like elements.

A liquefied gas transportation apparatus for reducing boil-off gas in accordance with one embodiment of the present invention may be used for transporting various liquefied gases, for example, liquefied petroleum gas (LPG), liquefied natural gas (LNG), liquefied carbon dioxide (L-CO2), etc.

Hereinafter, for example, an LNG transportation apparatus for transporting LNG will be described.

Hereinafter, referring to FIGS. 1 to 7, an LNG transportation apparatus for reducing boil-off gas in accordance with one embodiment of the present invention will be described in detail.

FIG. 1 is a perspective view of the LNG transportation apparatus for reducing boil-off gas in accordance with one embodiment of the present invention. FIG. 2 is a partially enlarged perspective view illustrating a second transportation pipe and a branch pipe of the transportation apparatus of FIG. 1.

First, referring to FIG. 1, an LNG transportation apparatus 1 for reducing boil-off gas in accordance with one embodiment of the present invention includes a first transportation pipe 10, second transportation pipes 20, and a discharge pipe 50, which are vertically formed in a quay 2. The LNG transportation apparatus 1 for reducing boil-off gas transports LNG using at least one of the transportation pipes.

A branch pipe 40 branches off from a bottom of the transportation pipe toward one side of the transportation pipe. The branch pipe 40 includes a resistor member which interrupts a flow of a LNG therein, thereby reducing a flow rate or flow speed of the LNG. Accordingly, when a LNG flows into the quay 2 through the branch pipe 40, the LNG may be properly maintained inside the transportation pipe from the bottom at which the branch pipe 40 is located to a top which is inserted into the quay 2.

Hereby, a pressure inside the transportation pipe increases. Accordingly, boil-off of the LNG caused by an unexpected pressure drop in a pipe conduit may be prevented and the occurrence of boil-off gas generated by vaporization of the LNG may be effectively reduced.

The branch pipe 40 may branch off from any one of the transportation pipes including the first transportation pipe 10, the second transportation pipe 20, and the discharge pipe 50. Hereinafter, in accordance with one embodiment of the present invention, it will be described that the branch pipe 40 branches off from the second transportation pipe 20 which allows the LNG to flow into or be discharged from the quay 2. When the branch pipe 40 is formed at the second transportation pipe 20, the LNG may be easily loaded in the quay 2 using both the first transportation pipe 10 and the second transportation pipe 20 while maintaining a minimal inflow of boil-off gas. It will be described below in detail.

Hereinafter, respective components and functions of the LNG transportation apparatus 1 for reducing boil-off gas will be described in more detail.

Referring to FIGS. 1 and 2, the first transportation pipe 10, the second transportation pipe 20, and the discharge pipe 50 are vertically installed on one side of the quay 2. Here, the first transportation pipe 10 may be a transportation pipe which allows the LNG to flow into the quay 2, and the second transportation pipe 20 may be a transportation pipe which allows the LNG to flow into the quay 2 or to be discharged outside the quay 2. That is, the second transportation pipe 20 may be used as a general discharge pipe which discharges the LNG outside the quay 2 but may be used in various ways using the branch pipe 40. In accordance with one embodiment of the present invention, the branch pipe 40 branches off from the second transportation pipe 20. The discharge pipe 50 is a pipe for completely discharging the LNG which remains in the quay 2 to the outside of the quay 2 and may be adjacently installed to the first transportation pipe 10 and the second transportation pipe 20.

A connection pipe 30 is connected between the first transportation pipe 10 and the second transportation pipe 20. Accordingly, when flowing into the quay 2, the LNG may selectively move through the first transportation pipe 10 or the second transportation pipe 20 along the connection pipe 30. For this, control valves 110 and 310 (refer to FIGS. 4 to 6) may be formed on one side of the connection pipe 30 and the first transportation pipe 10. The transportation pipes which consist of the first transportation pipe 10, the second transportation pipe 20, and the discharge pipe 50 are mutually connected and integrally formed, and as shown in the drawings, may extend outside the quay 2 through an opening formed on a top end of the quay 2.

The branch pipe 40, as shown in FIG. 2, branches off from a bottom of the second transportation pipe 20 and an end portion thereof is open toward a bottom surface of the quay 2. The branch pipe 40, in detail, may branch off from a check valve 201 connected to the second transportation pipe 20, and as shown in the drawings, may be formed in a shape of being bent at least once toward the bottom surface of the quay 2.

An orifice plate 410 is inserted into the branch pipe 40. The orifice plate 410 includes at least one flow hole 411 to pass only a part of the LNG which flows into the branch pipe 40 through the flow hole 411. That is, the orifice plate 410 acts as a resistor member which interrupts a flow of the LNG in the branch pipe 40 to prevent a pressure drop in the second transportation pipe 20 and maintains the second transportation pipe 20 with a certain pressure or more. The orifice plate 410 may be formed in a disc shape corresponding to a cross-sectional shape of the branch pipe 40, but is not limited thereto, and may be modified in various shapes unlike the shape of the branch pipe 40.

The resistor member interrupts a flow of a fluid in a pipe conduit to reduce a flow rate or a flow speed of the fluid and is not limited to a plate-shaped member such as the orifice plate 410. Accordingly, the orifice plate 410 described above is an example of the resistor member and members having various shapes, which are not standardized, may be inserted into the branch pipe 40 and may function as the resistor member.

A fluid mixing device 420 is formed between the end portion of the branch pipe 40 and the orifice plate 410. The fluid mixing device 420, for example, may be formed as a static mixer into which helical wings formed to intersect with one another while being twisted are inserted and may mix a slight amount of boil-off gas which arrives at the branch pipe 40 with the LNG which is in a state of being just before discharge, thereby preventing the boil-off gas from directly flowing into the quay 2. Also, the fluid mixing device 420, like the orifice plate 410, interrupts a movement of the LNG to prevent the pressure drop inside the second transportation pipe 20.

The check valve 201 is formed between the branch pipe 40 and the second transportation pipe 20. The check valve 201 is coupled with the bottom of the second transportation pipe 20, in detail, a pump connection pipe 210 which connects the second transportation pipe 20 with a pump 220 and may move the LNG which flows into the second transportation pipe 20 to the branch pipe 40. That is, the check valve 201 functions as a valve which controls a flow path of the LNG to allow the LNG supplied to the transportation pipe to be discharged through the branch pipe 40. Meanwhile, the check valve 201 may include an opening and closing unit 201a (refer to FIG. 3) which opens in one direction therein to prevent the LNG from flowing backward to the pump 220 connected to the second transportation pipe 20.

A valve which controls the flow path of the LNG is not limited to the check valve 201. The branch pipe 40 or the transportation pipe may be opened and closed using various valves in addition thereto to easily move the LNG from the transportation pipe to the branch pipe 40. Also, such a valve may be connected not only to the transportation pipe but also to the branch pipe 40 or may be connected to both the transportation pipe and the branch pipe 40 as necessary.

The bottom of the second transportation pipe 20 is formed of two portions such as the pump connection pipe 210 and a buffer pipe 230. The pump connection pipe 210 is connected to the pump 220 via the check valve 201, and the buffer pipe 230 extends toward the bottom surface of the quay 2 while an end portion thereof is closed. Accordingly, the LNG which flows into the second transportation pipe 20 arrives at the check valve 201 along the pump connection pipe 210, and then a path thereof is controlled to move to the branch pipe 40. The buffer pipe 230 is to maintain a part of the LNG which drops in a direction of gravity when the LNG flows in or out. Here, a length thereof may be appropriately controlled as necessary.

The pump 220 is connected to the pump connection pipe 210. The pump 220 is used to discharge the LNG loaded in the quay 2 to the outside of the quay 2, and for example, may be formed as a centrifugal pump which allows the fluid to flow using torque of an impeller. The check valve 201 described above may not only prevent the LNG from flowing backward to the pump 220 to allow the LNG to be smoothly unloaded when the LNG is discharged to the outside of the quay 2 along the second transportation pipe 20 by driving of the pump 220, but also may provide the LNG to the branch pipe 40 to allow the LNG to smoothly flow into the quay 2 when the LNG is loaded in the quay 2.

FIG. 3 is a cross-sectional view illustrating insides of the branch pipe and the check valve of FIG. 2.

Hereinafter, referring to FIG. 3, a pressure maintenance function of the LNG transportation apparatus for reducing boil-off gas in accordance with one embodiment of the present invention will be described in more detail.

The LNG which flows into the second transportation pipe 20 descends in the direction of gravity to arrive at the bottom of the second transportation pipe 20 and flows into the check valve 201 along the pump connection pipe 210 again (refer to FIG. 3 for an arrow). Here, as shown in the drawings, the opening and closing unit 201a is closed in such a way that the LNG does not proceed toward the pump 220 and all of the same is provided to the branch pipe 40. Meanwhile, the opening and closing unit 201a is opened when the LNG is unloaded and may be formed to rotate toward the branch pipe 40 to close the branch pipe 40 while being opened.

The LNG provided to the branch pipe 40 is prevented from flowing by the orifice plate 410 and only a part of the same passes through the flow hole 411. Accordingly, the pressure is transferred from the orifice plate 410 in a reverse direction in an order of the check valve 201 and the pump connection pipe 210, thereby maintaining the pressure inside the second transportation pipe 20 at a certain degree or more in which it is difficult for boil-off of the LNG to occur. Here, changes are made in the number and a distribution state of the flow hole 411, thereby increasing or reducing the pressure inside the second transportation pipe 20. Also, when necessary, the pressure inside the second transportation pipe 20 may be increased by repetitively installing the orifice plate 410 or additionally installing another resistor member in addition to the orifice plate 410.

The LNG which passes through the orifice plate 410 passes through the fluid mixing device 420 and is discharged into the quay 2. When a diameter of the branch pipe 40 increases, a discharge speed of the LNG may decrease. Here, a slight amount of boil-off gas which occurs inside the transportation pipe, as described above, is merely mixed with the LNG while passing through the fluid mixing device 420 but can not directly flow into the quay 2. Also, the slight amount of boil-off gas may be condensed to a liquid state during a process of being mixed with the LNG and remaining boil-off gas is pulverized into micro bubbles to flow into the quay 2. However, gas ingredients having a micro bubble size can also not float on a surface of the LNG due to a fluid static pressure of the LNG and remain at the bottom surface of the quay 2 and are condensed. Through this process, the pressure inside the second transportation pipe 20 to which the branch pipe 40 is connected is maintained and the occurrence of the boil-off gas is effectively reduced.

FIGS. 4 to 6 are schematic operation diagrams of the transportation apparatus of FIG. 1. FIG. 7 is a flowchart illustrating a process of loading the LNG using the transportation apparatus of FIG. 1.

Hereinafter, referring to FIGS. 4 to 7, an operation process of the LNG transportation apparatus for reducing boil-off gas in accordance with one embodiment of the present invention will be described. The operation process will be described in detail based on a process of loading the LNG shown in FIG. 7.

To load the LNG (refer to FIGS. 5 and 6 for A) in the quay 2, an LNG A is provided to the second transportation pipe 20 along arrows shown in FIG. 4 (S100).

Here, the first transportation pipe 10 is a transportation pipe for allowing the LNG A to flow into the quay 2 and needs not be adjacent to the bottom surface of the quay 2. On the contrary, the second transportation pipe 20 is a transportation pipe which allows the LNG A to flow out of the quay 2, and accordingly, needs to be installed adjacent to the bottom surface of the quay 2. Accordingly, an end portion of the first transportation pipe 10 may be located in a place higher than those of the end portions of the second transportation pipe 20 and the branch pipe 40 from the bottom surface of the quay 2.

The control valves 110 and 310 capable of opening and closing a pipe conduit are formed on one side of the first transportation pipe 10 and the connection pipe 30 to cut off a path of the LNG A which flows into the transportation pipe from the first transportation pipe 10 and to allow the path to be toward the second transportation pipe 20. Accordingly, as shown in FIG. 5, the LNG A is discharged from the bottom of the second transportation pipe 20 to the quay 2 through the branch pipe 40 (S200). Accordingly, the inside of the second transportation pipe 20 is maintained with a certain pressure or more in such a way that the LNG A may be easily transported to the quay 2 while reducing the occurrence of boil-off gas.

Here, it may be maintained that all the control valves 310 located on the connection pipe 30 are opened and the control valve 110 located on the first transportation pipe 10 is closed.

An inflow process of the LNG A as described above is continued until the LNG A arrives at a reference height of the inside of the quay 2 (S300). The reference height of the inside of the quay 2 may be identical to or slightly higher than a height of the end portion of the first transportation pipe 10 through which the LNG A flows in. When the LNG A arrives at the reference height, the end portion of the first transportation pipe 10 is located below a surface of the LNG A which flows into the quay 2.

In this state, as shown in FIG. 6, opening and closing states of the control valves 110 and 310 are changed and the LNG A is provided to the first transportation pipe 10 (S400). Since the LNG A is discharged below the surface of the LNG which already flows in the quay 2, a flow rate is reduced by resistance of a fluid and a rapid pressure drop does not occur. Hereby, the LNG A may be transported through the first transportation pipe 10 while reducing an amount of the boil-off gas.

The LNG A is continuously provided until loading of the LNG A is completed by filling the quay 2 with the LNG A to be over the reference height (S500). As described above, the second transportation pipe 20 connected with the branch pipe 40 and the first transportation pipe 10 not connected with the branch pipe 40 are used in combination to easily load the LNG A in the quay 2 while minimizing the occurrence of the boil-off gas.

Next, a modified example of the check valve included in one embodiment of the present invention will be described.

FIGS. 8 and 9 are cross-sectional views illustrating a modified example of the check valve included in the LNG transportation apparatus for reducing boil-off gas in accordance with one embodiment.

Compared with the check valve of FIG. 3, a check valve 500 according to the modified example has a little bit different shape of an opening and closing unit and a portion for coupling with the opening and closing unit but other portions may be identically formed.

The check valve 500 according to the modified example may be bolt-coupled with the pump connection pipe 210 and the branch pipe 40 using a flange 510 in the middle of the pump connection pipe 210. It is shown as an example that the check valve 500, the pump connection pipe 210, and the branch pipe 40 are bolt-coupled. However, another coupling method capable of maintaining coupling-durability at an extremely low temperature is employable.

An opening and closing unit 520 included in the check valve 500 according to the modified example includes a disc 530, a seat ring 540 fixed to the disc 530, and a hinge portion 550 which rotatably fixes the disc 530.

The disc 530 is formed to have a size greater than an inside diameter of the pump connection pipe 210 to close an inside diameter of the check valve 500 on the side of the pump connection pipe 210.

The seat ring 540 is provided on one surface of the disc 530 in a protruding ring shape to seal a gap between the check valve 500 and the pump connection pipe 210 or to minimize an amount of the LNG which flows in or is discharged through the pump connection pipe 210 when the opening and closing unit 520 closes the pump connection pipe 210.

Inside the check valve 500 coupled with the pump connection pipe 210, an accommodating portion 560 capable of accommodating the seat ring 540 is provided corresponding to the seat ring 540. The accommodating portion 560 is formed to have a diameter greater than the inside diameter of the check valve 500 to allow a front surface and an outer circumferential surface of the seat ring 540 to be in contact with the accommodating portion 560.

The hinge portion 550 is to rotatably fix the disc 530 to the inside of the check valve 500 and includes a hinge pin 551 and a body portion 552 which connects the hinge pin 551 with the disc 530.

The hinge pin 551 may include a torsion member (not shown) which provides a force in a direction in which the opening and closing unit 520 closes the pump connection pipe 210 when an external force does not act.

The body portion 552 may include a supporting portion 553 provided in a position opposite to the disc 530 and is supported by the inside of the check valve 500 when the opening and closing unit 520 is opened.

Next, an operation of the check valve 500 will be described.

The LNG which flows into the second transportation pipe 20 descends in the direction of gravity to arrive at the bottom of the second transportation pipe 20 and flows into the check valve 500 along the pump connection pipe 210 again (refer to FIG. 8 for an arrow). Here, as shown in the drawings, the opening and closing unit 520 is closed in such a way that the LNG does not proceed toward the pump 220 and all of the same is provided to the branch pipe 40. Meanwhile, when the LNG is unloaded, the pump 220 drives and the opening and closing unit 520 pivots due the driving of the pump 220 in such a way that the pump connection pipe 210 is opened and the branch pipe 40 is closed. Accordingly, the LNG does not proceed toward the branch pipe 40 and is guided to the second transportation pipe 20 through the pump connection pipe 210 and the check valve 500 (refer to FIG. 9).

While the embodiments of the present invention have been described with reference to the figures, it will be understood by those of ordinary skill in the art that various changes in form and details may be made therein without departing from the spirit and scope of the present invention as defined by the following claims. Therefore, it will be understood that the embodiments described above are just exemplary but not limitative in all aspects.

BRIEF DESCRIPTION OF REFERENCE NUMERALS

1: Liquefied natural gas (LNG) transportation apparatus for reducing boil-off gas
2: Quay
10: First transportation pipe
110, 310: Control valves
20: Second transportation pipe
201: Check valve
201a: Opening and closing unit
210: Pump connection pipe
220: Pump
230: Buffer pipe
30: Connection pipe
40: Branch pipe
410: Orifice plate
411: Flow hole
420: Fluid mixing device
50: Discharge pipe
A: LNG

The invention claimed is:

1. A liquefied natural gas (LNG) transportation apparatus for reducing boil-off gas, comprising:
    at least one transportation pipe which is vertically formed in a vessel or container which stores LNG and transports the LNG;
    a branch pipe which branches off from a bottom of the transportation pipe toward one side of the transportation pipe, and an end portion thereof is open toward a bottom surface of the vessel or container;
    a valve which is connected to at least one of the branch pipe and the transportation pipe and opens and closes one of the branch pipe and the transportation pipe to move the LNG from the transportation pipe to the branch pipe; and
    a resistor member which intervenes in the branch pipe to interrupt a flow of the LNG,
    wherein the transportation pipe comprises a first transportation pipe which allows the LNG to flow into the vessel or container and a second transportation pipe which allows the LNG to flow into the vessel or container or to be discharged outside the vessel or container,
    wherein the branch pipe branches off from the second transportation pipe, and
    wherein the valve is formed as a check valve which is connected to a bottom of the second transportation pipe to prevent the LNG discharged along the second transportation pipe from flowing backward, and the branch pipe branches off from the check valve.

2. The apparatus of claim 1, wherein the resistor member is an orifice plate which comprises at least one flow hole through which the LNG passes.

3. The apparatus of claim 1, wherein the transportation pipe further comprises a connection pipe which connects the first transportation pipe with the second transportation pipe, and the LNG selectively moves to one of the first transportation pipe and the second transportation pipe along the connection pipe.

4. The apparatus of claim 1, wherein an end portion of the first transportation pipe is located at a place higher than those of end portions of the second transportation pipe and the branch pipe from the bottom surface of the vessel or container.

5. The apparatus of claim 1, further comprising a fluid mixing device inserted into the branch pipe and disposed between an end portion of the branch pipe and the resistor member.

6. The apparatus of claim 1, wherein the valve comprises an opening and closing unit which selectively opens and closes the branch pipe and the transportation pipe.

* * * * *